United States Patent Office 3,558,622
Patented Jan. 26, 1971

3,558,622
PROCESS FOR THE PRODUCTION OF 2,4-DI-
AMINO-6-ALKYLTHIO-s-TRIAZINE
Walter Rufener, Zurich, Switzerland, Raoul Berger, Saint-Louis-la-Chaussee, France, and Jean Riethmann, Allschwil, Basel-Land, Switzerland, assignors to Geigy Chemical Corporation, Greenburgh, N.Y., a corporation of New York, and J. R. Geigy A.G., Basel, Switzerland, a corporation of Switzerland
No Drawing. Filed July 25, 1968, Ser. No. 747,448
Int. Cl. C07d 55/20
U.S. Cl. 260—249.8                                9 Claims

ABSTRACT OF THE DISCLOSURE 2,4 - diamino - 6 - alkylthio-s-triazines are prepared by reacting 2,4-diamino-6-chloro-s-triazines with alkali-metal alkylmercaptide in an aqueous medium. The reactions are effected at elevated temperature and under pressure. An illustrative embodiment is the reaction of 2,4-bis-isopropylamino-6-chloro-s-triazine with sodium methylmercaptide to yield 2,4-bis-isopropylamino-6-methylthio-s-triazine.

BACKGROUND OF THE INVENTION

Field of the invention

The invention relates to a process for the production of 2,4-diamino-6-alkylthio-s-triazines from 2,4-diamino-6-chloro-s-triazines and alkali metal alkylmercaptide in an aqueous medium, optionally containing emulsifying agents, within a well defined temperature range, the lower limit thereof being 120° C., the temperature at which the 2,4-diamino-6-alkylthio-s-triazines are molten, the upper limit being 220° C. and under pressures which correspond to said temperatures in a given closed reaction system. On the basis of previous experience with reactions of 2,4-diamino-6-chloro-s-triazines with sodium methylmercaptide in aqueous media, it was commonly believed to be essential not to surpass the melting temperatures of the mixtures of the starting s-triazine derivatives and the final products in said media, in order to avoid a further decrease of the already slow reaction rates and considerably higher contents of 2,4-diamino-6-chloro-s-triazines in the end products. Hence, it was to be expected that the application of the above-mentioned reaction conditions to the subject reactions would delay the conversion rate thereof and that the reaction products would contain large proportions of starting s-triazine derivatives. Surprisingly such is not the case. On the contrary, it has been found that the reaction of 2,4-diamino-6-chloro-s-triazines with alkali-metal alkylmercaptides carried out under the inventive conditions which insure the presence of two liquid phases during all or part of the condensation, proceeds with fast reaction rates and provides the desired end products in excellent yields and practically free of the starting s-triazine derivatives.

2,4-diamino-6-alkylthio-s-triazines inhibit the growth of plants and are widely used as herbicides. Especially valuable commercial herbicides are Prometryne (2,4-bis-isopropylamino-6-methylthio-s-triazine), Ametryne (2-ethylamino - 4 - isopropylamino - 6 - methylthio-s-triazine), Simetryne (2,4 - bis - ethylamino - 6 - methylthio-s-triazine), etc., which are used both, as selective herbicides for weed control among cultivated plants and as soil sterilants for the total elimination of undesired plant growth.

Description of the prior art 2,4 - diamino - 6 - alkylthio-s-triazines have heretofore been produced by reacting 2,4-diamino-6-chloro-s-triazines in suspension in an aqueous medium with an aqueous solution of excess sodium methyl mercaptide at elevated reaction temperatures for a time of up to 20 hours.

Although the desired end products are obtained in reasonable yields, a number of disadvantages inhere in this aqueous procedure. Due to the heterogeneity of the reaction mass (solid-liquid slurry), the reactions proceed at a slow rate and for this reason undesirably long times are required for the reactions to be completed and rather high contents of starting s-triazine derivatives in the final products are obtained. Another critical point in the aqueous procedure are the temperature conditions: it is important that in order to proceed at a reasonable rate and to result in an end product of high purity, the reactions are carried out in optimum temperature ranges which are below the melting temperatures of the mixtures of starting s-triazine derivatives and final products in the respective aqueous reaction systems. However, even if the critical reaction conditions are thoroughly observed, the required specification of less than 1.0% of starting s-triazine derivative in the final product cannot be reached within reasonable time.

Up to now the attempts to overcome the above disadvantages have not been very successful. Starting e.g. with more dilute suspensions of the 2,4-diamino-6-chloro-s-triazines indeed increases the reaction rate somewhat; it decreases, however, the batch size considerably which is most undesirable from a technical and commercial point of view. One would also think that a large excess of sodium methyl mercaptide would force the reaction of the residual starting s-triazine derivatives and affect the reaction rate; however, even with 300% excess of sodium methyl mercaptan and with long reaction times the reaction does not proceed to completion. Moreover, the use of such large excess of sodium methyl mercaptide involves complex recovery operations for methyl mercaptan, which require considerable time and great care to avoid injury of personnel. Operating in different pH ranges and attempting to increase the solubility of the sodium methyl mercaptide by use of more than equivalent amounts of sodium hydroxide in the preparation of the starting sodium methyl mercaptide also fail to provide high purity end products and faster reaction rates.

Another process for the production of 2,4-diamino-6-alkylthio-s-triazines employs aqueous-organic solutions, particularly solutions in aqueous isopropanol, for the reaction of 2,4-diamino-6-chloro-s-triazines with sodium methyl mercaptide. The process involves the addition of the starting s-triazine derivative to a mixture of aqueous sodium methyl mercaptide and isopropanol and refluxing said mixture for one to three hours. In a variation of the process a slurry of a starting s-triazine derivative in water is introduced in aqueous isopropanol, a sodium hydroxide solution is added, air is excluded by flushing the reaction vessel with nitrogen and methyl mercaptan is passed into the above solution. After refluxing the reaciton mixture for one to three hours, the isopropanol is distilled off and the final product is then further crystallized from the reaction mass.

With the solvent process the required specification of less than 1.0% of starting s-triazine derivative in the final product is reached within reasonable time and with reasonable methyl mercaptan excess. The process, moreover, does not require critical observation of any temperature limits, since it proceeds at the reflux temperature of the solvent. The disadvantages of the solvent process are, however, obvious: highly inflammable solvents have to be handled by the operators, which is inconvenient and dangerous; the recycling of the solvents after completion of the reactions not only causes considerable loss of time and not only affects unfavorably the capacity of a given reaction unit, but also is very hazardous because of the presence therein of up to 5% of unreacted methyl mercaptan, a most poisonous and obnoxious substance. In addition, the recovery rate of the excess methyl mercaptan from the reaction mixture is rather poor: the recycled solvent contains only up to 60% (as compared to 95% in the process of the invention) of the excess mercaptan introduced in the reaction. The loss of mercaptan is probably due to the fact that methyl mercaptan is much more sensitive to oxidation in organic solvents than in aqueuos solution. Therefore, much more attention has to be paid to the exclusion of air in the solvent process than in the aqueous procedure, which is also rather inconvenient and handicapping in the operation of said process.

The discussion of the art makes sufficiently clear that the use of the above processes for the reaction of 2,4-diamino-6-chloro-s-triazines and sodium methyl mercaptan does not provide expedient means for obtaining the final 2,4-diamino-6-alkylthio-s-triazines under reasonable economical and technical conditions.

SUMMARY OF THE INVENTION

The present invention relates to a process of overcoming the disadvantages described above by carrying out the reaction of 2,4-diamino-6-chloro-s-triazines with alkali metal alkylmercaptide in an aqueuos system, optionally containing emulsifying agents, within a well defined temperature range, the lower limit being 120° C. at which temperature the end products (2,4-diamino-6-alkylthio-s-triazines) form a liquid phase, the upper limit being 220° C., and under pressures which correspond to said temperatures in a given reaction system. The amount of water in the aforesaid aqueous system should be such that a well stirrable slurry containing up to 35%, and preferably about 20-30% by weight of the starting triazine is obtianed.

This improved process provides the desired end products in excellent yields within the required specifications, containing less than 1.0% and, under the preferred reaction conditions set forth below, even less than 0.1% of starting 2,4-diamino-6-chloro-s-triazines. The reaction rate is fast, critical reaction conditions are completely avoided, and the inconvenient use and recovery of solvents is omitted; the process thus offers considerable savings in cycle time compared to the solvent procedure, the batch size being otherwise the same: the increase in the capacity of a given reaction unit as provided by the inventive process is obvious. Moreover, the process operates with reasonable excess rates of mercaptan which are comparable to that of the solvent process, the recovery rates, however, being considerably higher. It is obvious that the rate of recovery has an effect on the toxicity of the effluent. Another advantage of the instant improved aqueous process is the avoidance of troublesome operations with nitrogen in order to exclude air from the reaction.

DETAILED DESCRIPTION OF THE INVENTION

The 2,4-diamino-6-alkylthio-s-triazines prepared according to the process of this invention correspond to the formula

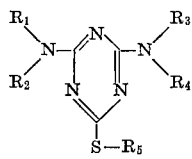

wherein $R_5$ means lower alkyl, in particular, methyl or ethyl, and $R_1$, $R_2$, $R_3$ and $R_4$ represent hydrogen or lower alkyl, preferably $R_2$ and $R_4$ represent lower alkyl. Optimal results are obtained when, in the final products of the aforesaid formula, each of $R_1$ and $R_3$ represents hydrogen and each of $R_2$ and $R_4$ represents lower alkyl.

The term lower alkyl as used herein means saturated monovalent aliphatic radicals of the general formula $-C_mH_{2m+1}$ wherein $m$ designates an integer of less than 5 and is inclusive of radicals such as methyl, ethyl, n-propyl, isopropyl, n-butyl, isobutyl, sec. butyl and t-butyl. In lieu of the term "thio" the term "mercapto" is also used herein.

The above compounds are prepared as follows:

To a pressure reaction apparatus equipped with agitator, heating device, gas inlet tube with valve, thermometer, pressure gauge and internal cooling coil are charged: the starting 2,4-diamino-6-chloro-s-triazine; water; alkali metal hydroxide, preferably sodium hydroxide, and optionally an emulsifying agent.

The reaction apparatus is then closed and alkylmercaptan distilled into the mix through the gas inlet tube. The reaction vessel is then heated to a temperature range, the lower limit thereof being 120° C., the upper limit being 220° C. The pressure in the given vessel rises thereby correspondingly to the applied temperature and to the molar ratio of the amount of mercaptan to the amount of alkali, e.g., sodium hydroxide. In a preferred mode of carrying out the process of the invention in practice, the temperatures used are between 130 and 180° C., with pressures rising up to 200 p.s.i. absolute pressure when the temperature is 180° C. and the aforesaid molar ratio is about 1.03:1.

After completion of the reaction, i.e., after a few minutes to three hours, depending on the applied temperature, the reactor is cooled to about 100° C. whereby the pressure in the vessel drops to ambient pressure. Excess alkylmercaptan and some water are then distilled through the gas inlet tube, and collected in an alkali metal hydroxide, preferably a sodium hydroxide solution. The formed alkali metal alkylmercaptide soltuion, containing substantially all the excess alkylmercaptan as introduced into the reaction, can readily be reused in the process. When no more mercaptan is collected in the distillate, the content of the vessel is further cooled with agitation to room temperature. The slurry of 2,4-diamino-6-alkylthio-s-triazine is filtered, the product washed with water and dried. The mother liquor contains no more than 0.05% alkylmercaptan which can readily be oxidized with bleach solution into an odorless, practically nontoxic compound. The reaction mixtures may also be worked up, especially in the continuous procedure by adding a suitable solvent, preferably toluene, heating the mixture until the final product is dissolved, filtering and allowing the two liquid phases of the mixture to separate.

The organic solution which contains the final product is then washed, e.g. with water, and freed from solvent under vacuum. The material prepared according to this procedure is free of impurities insoluble in the solvent.

The alkali metal hydroxide can be charged into the reaction apparatus as caustic alkali or in the form of an aqueous solution thereof.

The reactions of 2,4-diamino-6-chloro-s-triazines with alkylmercaptides may be carried out as continuous operations; one may, however, also proceed in a batchwise manner.

A reasonable rate of reaction is obtained by using in the reaction an excess of at least about 1.5 mole percent, and preferably, of about 10 to 20 mole percent, of methyl mercaptan in regard to the starting s-triazines. Decreasing the excess results in slower rates of reaction. A large excess is especially desirable in a continuous procedure since by this way, the procedure is less subject to charging errors.

If emulsifying agent such as, e.g., Sorbit P (sulfonated butyl naphthalene), Marasperse (lignin sulfonate), Sellasol TD (condensation product of naphthalene sulfonic acid with formaldehyde), Tinovetin NR (condensation product of nonyl phenol with ethylene oxide), etc., are used, these are applied in amounts of preferably, 0.75–1.5% of the weight of the starting s-triazine derivative, although higher amounts may be used. A low emulsifier concentration is, however, desirable, if the end product is to be separated from the reaction mass as a liquid. The emulsifier requirement is influenced by the type of equipment used in the process and is, therefore, in no way limited.

Limits on temperature and pressure are imposed by the type of reaction and the type of equipment chosen. Since the reaction is carried out above the boiling point of water, the pressure of the system rises above atmospheric pressure depending on the reaction temperature and, vice versa, since pressure limits are imposed by the equipment available, the temperature, at which the reaction is carried out, is limited depending on the pressure which can be applied. A lower temperature limit is further given by the fact that the end product, 2,4-diamino-6-alkylthio-s-triazine, must be molten in order to provide at least toward the end of the reaction a liquid-liquid reaction system; an upper limit is established by the rate of hydroysis of the products and is in the range of 220° C. In order to impede hydrolysis at higher temperatures, the alkyl-mercaptan may be charged with a slight excess of at least about 1.5 mole percent or higher, preferably of about 3 mole percent, in respect to the alkali metal hydroxide. An optimum yield of high purity end products and reasonable reaction times are obtained when the reactions are carried out within these lower and upper limits.

The following examples are given as illustrative of the process which is not to be limited to the specific details set forth. Parts and percentages throughout are by weight. The first three examples are illustrative of prior art procedures. All p.s.i. values refer to absolute pressure; atm. values are above ambient pressure.

EXAMPLE 1

(PRIOR ART)

2,4-bis-isopropylamino-6-methylmercapto-s-triazine-solvent procedure

A slurry of 2,4-bis-isopropylamino-6-chloro-s-triazine in water, obtained from 166.5 g. of cyanuric chloride (0.9 mole), reacted with isopropylamine in methyl ethyl ketone and subsequent removal of the methyl ethyl ketone by distillation, was charged to a 2-liter resin flask at room temperature together with 846 g. of aqueous isopropanol containing approximately 16% of water. After adding 46.8 g. of sodium hydroxide as a 50% solution (1.17 moles) the reactor was purged with nitrogen. An ampulla, filled with 56.3 g. of methyl mercaptan (1.17 moles) was connected to the reactor via a gas inlet tube. Methyl mercaptan was distilled into the reactor within 30-40 minutes. After this addition, the agitated reaction mass was heated to reflux temperature of 80-84° C. After reacting at reflux for 3 hours, isopropanol was distilled off until an overhead temperature of 88-90° C. was reached. 95-98% of the solvent was recovered as 82-84% material and reused. It contained 20-60% of the excess methyl mercaptan. The reaction mass was cooled slowly. 2,4-bis-isopropylamino - 6-methylmercapto-s-triazine crystallized at about 90° C. The mass was cooled to room temperature, filtered through a cotton filter, and washed with cold water. The product was dried in a vacuum oven at temperatures below 90° C. 2,4-bis-isopropylamino-6-methyl-mercapto-s-triazine containing 0.4% of 2,4-bis-isopropylamino-6-chloro-s-triazine was recovered with a yield of 97.3% based on cyanuric chloride.

EXAMPLE 2 (PRIOR ART)

2,4-bis-isopropylamino-6-methylmercapto-s-triazine-aqueous procedure at 92–93° C.

A sodium methyl mercaptide solution was prepared from 48 g. of sodium hydroxide (1.2 moles as 30% solution) and 58 g. of methyl mercaptan (1.2 moles). This solution was added within 1 hour to a vigorously agitated suspension of 229 g. of 2,4-bis-isopropylamino-6-chloro-s-triazine (1.0 mole) in 1000 g. of water and 4 g. of Tinovetin NR at 92–93° C. The mixture was agitated for additional 17 hours at exactly this temperature, then cooled to room temperature and filtered. 2,4-bis-isopropylamino-6-methylmercapto-s-triazine with 1.3–1.9% of 2,4-bis-isopropylamino-6-chloro-s-triazine was recovered with yields above 98% based on 2,4-bis-isopropylamino-6-chloro-s-triazine.

EXAMPLE 3 (PRIOR ART)

2,4-bis-isopropylamino-6-methylmercapto-s-triazine-aqueous procedure at 100° C.

The reaction was carried out as described in Example 2, but the temperature was held at 100° C. After 20 hours of reaction time the product still contained 56% of 2,4-bis-isopropylamino-6-chloro-s-triazine.

EXAMPLE 4

2,4-bis-isopropylamino-6-methylmercapto-s-triazine-improved aqueous procedure 276 g. (1.20 moles) of 2,4-bis-isopropylamino-6-chloro-s-triazine in 450 g. of water containing 2–4 g. of emulsifier (e.g., Sorbit P) was charged to a 1-liter autoclave. 111 g. of 50% sodium hydroxide solution (1.39 moles) was diluted with 100 g. of water and 67.0 g. (1.39 moles) methyl mercaptan was added. This sodium mercaptan solution was added to the 2,4-bis-isopropylamino-6-chloro-s-triazine slurry. The reactor was closed pressure tight at room temperature and heated with agitation to 130–135° C. so that the pressure did not exceed 54 p.s.i. After 3–5 hours reaction time, the reactor was slowly cooled to 90° C., where the crystallization took place, then cooled to room temperature and opened. The slurry was filtered and the product washed with water and dried as above. 2,4-bis-isopropylamino-6-methylmercapto-s-triazine with less than 0.1% of 2,4-bis-isopropylamino-6-chloro-s-triazine was obtained with yields of 95–98% based on 2,4-bis-isopropylamino-6-chloro-s-triazine.

EXAMPLE 5

Improved Aqueous Procedure—Recovery of Methyl Mercaptan

The filtrate from a run made following the procedure given in Example 4 was neutralized with acetic acid to pH 6–7. 20% of the mother liquor was distilled off. The distillate collected contained 93.2% of the excess methyl mercaptan.

EXAMPLE 6

2,4-bis-isopropylamino-6-methylmercapto-s-triazine-improved aqueous procedure

In an autoclave, 180 g. of 2,4-bis-isopropylamino-6-chloro-s-triazine (0.784 mole) are mixed with 472 g. of water and 36.1 g. of sodium hydroxide (0.901 mole) to form a thin slurry. The autoclave is then closed. In the meantime, 44.9 g. of 100% methyl mercaptan (0.935 mole) from a pressure cylinder is distilled in a 130 ml. capacity test tube, with thick walls and fitted with a side-neck. The test tube is dipped in an ice/sodium chloride mixture. When the desired amount of methyl mercaptan has been distilled, the test tube is closed and the side neck is connected to the gas inlet pipe of the autoclave. The agitator of the autoclave is then switched on and the cooling fully opened. The mercaptan is then allowed into the autoclave. The pressure in the autoclave climbs temporarily to 1.1 atms. Finally, the test tube is heated for a short time in order to evaporate the last rest of the mercaptan.

The test tube contains a saturated mercaptan atmosphere. The amount of this mercaptan is determined by analysis (necessary to establish the balance of mercaptan). For this purpose, the test tube is cooled again with the ice/sodium chloride mixture; it is then disconnected from the autoclave and its content mixed with 20 g. of sodium hydroxide. The content of the test tube is then diluted with water to exactly 250 ml. in a volumetric flask. Methyl mercaptan is determined by iodometry. According to experiences, 0.5 to 0.4 g. of methyl mercaptan is found in the solution. That means that the amount of mercaptan charged in the autoclave is of 44.5 to 44.4 g. of methyl mercaptan (0.925 to 0.927 mole).

The charge is rapidly heated to 180° C. and kept at this temperature for ten minutes. Heating time: about 30 minutes. During the condensation, the pressure rises temporarily to 13 atms. After the ten minutes at 180° C., the condensation is over. The autoclave is then cooled to 90° C. (Cooling time: about 20 minutes.) At this temperature, the gas inlet pipe is connected with a descending condenser. The condenser discharges into a receiving vessel which contains 30 g. of 50% aqueous sodium hydroxide solution and 170 g. of water. For safety, the receiving vessel is connected with a bubbler in which 20 g. of sodium hydroxide and 180 g. of water have been charged. The stopcock on the gas inlet pipe is opened carefully (pressure in the autoclave: less than 1 atm.), the charge is then heated up to boiling temperature 100 to 110° C. Water and the excess of methyl mercaptan distil off and are intercepted by the caustic. The distillation is continued until about 70 ml. of distillate has been gathered. (Duration: about 30 minutes.)

When the distillation is over, the charge is cooled to room temperature and the autoclave is opened. The 2,4-bis-isopropylamino-6-methylmercapto - s - triazine appears in form of hard lumps, which cling especially to the cooling coil. (In order to loosen these lumps, the cooling coil can be heated from inside with steam. Melting point of 2,4-bis-isopropylamino-6-methylmercapto - s - triazine: 119° C.).

The reaction mixture (volume about 730 ml.) is charged in a 2000 ml. capacity round flask. The autoclave is rinsed first with 200 g. of water, then with 173 g. of toluene (200 ml.). Both rinses are mixed with the charge. Volume of the mixture: 1130 ml. The mixture is heated to reflux on the oil bath (reflux condenser) until all the 2,4-bis-isopropylamino-6-methylmercapto - s - triazine is melted (time: about 5 minutes), then filtered through a heated pressure filter (fritted glass P-4, with a 10 g. Kieselghur layer) at a temperature of about 80° C. Filtration pressure: about 170 mm. Hg. Filtration time: about 6 minutes.

Flask and filter are washed with 260 g. of toluene (300 ml.). The filtered two phases mixture is separated in a separatory funnel. Separation time: about 3 minutes. The separation is very sharp. The toluene solution, which contains the 2,4 - bis - isopropylamino - 6 - methylmercapto-s-triazine is practically colorless. The aqueous phase is yellow. Temperature at the separation: about 70° C.

The toluene solution (volume 690 ml.) is washed with about 100 ml. of water and is then freed from solvent under vacuum (best in a thin layer evaporator). Temperature of the oil bath: 120 to 140° C. 2,4-bis-isopropylamino - 6 - methylmercapto - s - triazine remains in the distillation container as a pale yellow or colorless liquid. It is poured on an enameled tin sheet. While cooling, 2,4 - bis - isopropylamino - 6 - methylmercapto - s - triazine solidifies to a white brittle crystal mass, which is pulverized in the mortar. The content of 2,4 - bis - isopropylamino - 6 - chloro - s - triazine is less than 0.1%. Yield: 97.8% of theory based on 2,4 - bis - isopropylamino - 6 - chloro - s - triazine. M.P.: 118.5–119.5° C. Purity: 99–100% (based on perchloric acid titration, the balance consisting essentially of toluene).

Similar satisfactory results are obtained when the 36.1 g. of sodium hydroxide used in the above example is replaced by an equivalent amount of potassium hydroxide.

EXAMPLE 7

2-ethylamino-4-isopropylamino-6-methylmercapto-s-triazine 180 g. of 2 - ethylamino - 4 - isopropylamino - 6 - chloro-s-triazine (0.834 mole), 542 g. of water, 38.4 g. of sodium hydroxide (0.96 mole) and 47.2 g. of methylmercaptan (0.984 mole) are heated in a pressure vessel within approximately 30 minutes to 180° C., then cooled again to 100° C. within approximately 20 minutes. The pressure in the reaction vessel reaches temporarily approximately 194 p.s.i. Excess methylmercaptan is distilled off, and the 2 - ethylamino - 4 - isopropylamino - 6 - methylmercapto-s-triazine is isolated as described in Example 6. 2-ethylamino - 4 - isopropylamino - 6 - methylmercapto-s-triazine is obtained with a purity of 99–100% (perchloric acid titration) and with a yield of 96.8% of theory based on 2 - ethylamino - 4 - isopropylamino-6-chloro-s-triazine. M.P. 85–87° C. It contains less than 0.1% 2 - ethylamino - 4 - isopropylamino - 6 - chloro-s-triazine (as determined by gaschromatography and by thin layer chromatography).

EXAMPLE 8

2-methylamino-4-isopropylamino-6-methylmercapto-s-triazine 160 g. of 2 - methylamino - 4 - isopropylamino-6-chloro - s - triazine (0.793 mole), 514 g. water, 36.5 g. sodium hydroxide (0.912 mole) and 45.0 g. methylmercaptan (0.936 mole) are heated in a pressure vessel within approximately 30 minutes to 180° C. and then cooled again to 100° C. within approximately 20 minutes. During the operation the pressure in the reaction vessel rises temporarily to approximately 174 p.s.i. Excess methylmercaptan is distilled off and 2 - methylamino-4-isopropylamino - 6 - methylmercapto - s - triazine is isolated as described in Example 6. 2 - methylamino-4-isopropylamino - 6 - methylmercapto - s - triazine is obtained with a purity of 99–100% (based on perchloric acid titration) and with a yield of 96.3% of theory, based on 2 - methylamino - 4 - isopropylamino - 6 - chloro-s-triazine. It contains less than 0.1% of unreacted 2-methylamino - 4 - isopropylamino - 6 - chloro - s - triazine (as determined by gaschromatography and by thin layer chromatography); M.P. 82° C.

EXAMPLE 9

2-ethylamino-4-t-butylamino-6-methylmercapto-s-triazine 180 g. of 2 - ethylamino - 4 - t - butylamino - 6 - chloro-s-triazine (0.784 mole), 508 g. of water, 36.0 g. of sodium hydroxide (0.900 mole), and 44.5 g. methylmercaptan (0.924 mole) are heated in a pressure vessel within approximately 30 minutes to 180° C. and maintained for ten minutes at this temperature. The pressure in the vessel rises up to approximately 164 p.s.i. The reaction mixture is then cooled to 100° C. Excess methylmercaptan is distilled off and 2 - ethylamino - 4 - t - butylamino - 6 - methylmercapto - s - triazine is isolated as described in the similar Example 6. 2 - ethylamino-4-t-butylamino - 6 - methylmercapto - s - triazine is obtained with a purity of 99–100% (based on perchloric acid titration) and with a yield of 98.7% of theory, based on 2 - ethylamino - 4 - t - butylamino - 6 - chloro-s-triazine. It contains less than 0.1% of unreacted 2-ethylamino - 4 - t - butylamino - 6 - chloro - s - triazine (based on thin layer chromatography); M.P. 103° C.

EXAMPLE 10

2-ethylamino-4-isopropylamino-6-ethylmercapto-s-triazine 180 g. of 2 - ethylamino - 4 - isopropylamino - 6 - chloro-s-triazine (0.834 mole), 542 g. of water, 38.4 g. of sodium hydroxide (0.96 mole) and 61.0 g. of ethylmercaptan (0.982 mole) are heated in a pressure vessel within approximately 30 minutes to 180° C. and then cooled within approximately 20 minutes to 100° C. The pressure in the reaction vessel reaches temporarily approximately 200 p.s.i. Excess ethylmercaptan is distilled off and 2 - ethylamino - 4 - isopropylamino - 6 - ethylmercapto - s - triazine is isolated as indicated in Example 6. 2 - ethylamino - 4 - isopropylamino - 6 - ethylmercapto-s-triazine is obtained with a purity of 99% (based on perchloric acid titration) and with a yield of 91% of theory, based on 2 - ethylamino - 4 - isopropylamino - 6 - chloro - s - triazine. It contains less than 0.1% of 2 - ethylamino - 4 - isopropylamino - 6 - chloro-s-triazine (as determined by thin layer chromatography); M.P. 71–74° C.

EXAMPLE 11

2,4-di-isopropylamino-6-methylmercapto-s-triazine (reaction at 220° C.)

180 g. of 2,4-di-isopropylamino-6-chloro-s-triazine (0.784 mole), 508 g. of water, 36.1 g. of sodium hydroxide (0.901 mole) and 44.5 g. of methylmercaptan (0.924 mole) are heated in a pressure reaction vessel within approximately 45 minutes to 220° C. The charge is kept for approximately 30 minutes at this temperature, then cooled within approximately 25 minutes to 100° C. The pressure in the reaction vessel rises temporarily up to approximately 365 p.s.i. Excess methylmercapto is distilled off, and 2,4-di-isopropylamino - 6 - methylmercapto-s-triazine is isolated as described in Example 6. 2,4-di-isopropyl-amino-6-methylmercapto - s - triazine is obtained with a purity of 99–100% (based on perchloric acid titration) and with a yield of 90–95% of theory, based on 2,4-di-isopropylamino-6-chloro-s-triazine. It contains less than 0.1% of 2,4-di-isopropylamino - 6 - chloro-s-triazine (as determined by gas chromatography and by thin layer chromatography); M.P. 117.5–119.5° C.

EXAMPLE 12

2-ethylamino-4-isopropylamino-6-methylmercapto-s-triazine (continuous procedure)

A tubular shaped continuous reactor, subdivided into several reaction chambers, is fed with a continuous flow of 1 mole of 2-ethylamino-4-isopropylamino - 6 - chloro-s-triazine, 1.15 moles of sodium hydroxide, 1.20 moles of methylmercaptan and 67.5 moles of water. With the continuous flow of reaction mixture regulated so as to achieve an average holding time in the reactor of approximately 4 minutes and by adjusting the heating of the reactor so as to maintain throughout the reactor a temperature of approximately 180° C., a reaction mixture is obtained from which 2-ethylamino - 4 - isopropylamino-6-methylmercapto-s- triazine can be isolated in the usual manner with a purity of 99–100% (based on perchloric acid titration) and with a yield of 97.5% of theory, based on 2-ethylamino - 4 - isopropylamino-6-chloro-s-triazine. The end product contains less than 0.1% of unreacted 2-ethylamino - 4 - isopropylamino-6-chloro-s-triazine (as determined by thin layer chromatography); M.P. 85–87° C.

What is claimed is:

1. The process for the production of 2,4-diamino-6-alkylthio-s-triazines of the formula

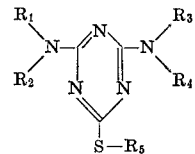

wherein $R_1$, $R_2$, $R_3$ and $R_4$ represent hydrogen or lower alkyl and $R_5$ represents lower alkyl, in which a 2,4-diamino-6-chloro-s-triazine is reacted in an aqueous medium with alkali metal alkylmercaptide at elevated temperatures, the improvement which comprises carrying out said reaction at least toward the end thereof in a liquid-liquid system within a temperature range of from 120° C. to 220° C., and under pressure which correspond to said temperatures in the given closed reaction system.

2. The improvement described in claim 1 in which the temperature range is from 130° C. to 180° C.

3. The improvement described in claim 1 in which in said reaction mixture emulsifying agents are used in the amount of from 0.75% to 1.5% calculated on the weight of the starting triazine.

4. The improvement described in claim 1 in which said alkali metal alkylmercaptide is sodium methylmercaptide which is present in an excess, of at least about 1.5 mole percent on the starting triazine.

5. The improvement described in claim 1 in which said 2,4-diamino - 6 - alkylthio-s-triazine is 2,4-di-isopropylamino-6-methylthio-s-triazine, and the starting triazine is 2,4-di-isopropylamino-6-chloro-s-triazine.

6. The process according to claim 5 in which in said reaction mixture emulsifying agent is used in amounts of from 0.75% to 1.5%, calculated on 2,4-di-isopropylamino-6-chloro-s-triazine, and in which the temperature is of from 130° C. to 180° C.

7. The process according to claim 5 in which said alkali metal alkylmercaptide is sodium methylmercaptide which is present in an excess of about 10 to 20 mole percent calculated on 2,4-di-isopropylamino-6-chloro - s- triazine.

8. A process as described in claim 1, wherein each of $R_1$ and $R_3$ in said formula represents hydrogen.

9. A process as described in claim 1, wherein the temperature range is from about 130° to 180° C. and the pressure rise is such that, at 180° C. and in the case of a molar ratio of alkyl mercaptan to alkali metal hydroxide of about 1.03:1, it reaches about 200 p.s.i. absolute pressure.

References Cited

UNITED STATES PATENTS

| | | | |
|---|---|---|---|
| 3,306,725 | 2/1967 | Knusli et al. | 260—249.8X |
| 3,326,912 | 6/1967 | Yamamoto et al. | 260—249.8 |
| 3,326,914 | 6/1967 | Knusli et al. | 260—249.8 |

HENRY R. JILES, Primary Examiner

J. M. FORD, Assistant Examiner

U.S. Cl. X.R.

71—93